United States Patent [19]

Ito et al.

[11] Patent Number: 4,659,323
[45] Date of Patent: Apr. 21, 1987

[54] METHOD FOR MAKING AXIAL-FLOW FILTERS AND APPARATUS THEREFOR

[75] Inventors: Yuuji Ito, Anjo; Tadahiko Shibata, Nukata; Masahiko Sakai, Takahama; Yukio Ota; Naohiko Kondo, both of Okazaki; Harukazu Matuyama, Takahama, all of Japan

[73] Assignee: Nippondenso Co., Ltd., Kariya, Japan

[21] Appl. No.: 690,757

[22] Filed: Jan. 11, 1985

[30] Foreign Application Priority Data

Feb. 20, 1984 [JP] Japan .................................. 59-29710
Apr. 24, 1984 [JP] Japan .................................. 59-82488

[51] Int. Cl.⁴ .............................................. B31B 1/52
[52] U.S. Cl. .................................... 493/457; 493/463; 493/470; 493/941
[58] Field of Search ............... 493/341, 451, 457, 463, 493/470, 906, 941; 72/385; 493/448, 940, 456

[56] References Cited

U.S. PATENT DOCUMENTS

| | | | |
|---|---|---|---|
| 1,989,015 | 1/1935 | McKellip | 493/463 |
| 2,531,555 | 11/1950 | Cummings et al. | 493/941 |
| 2,984,160 | 5/1961 | Whelton et al. | 493/941 |
| 4,181,070 | 1/1980 | Robbins et al. | 493/341 |
| 4,201,119 | 5/1980 | Wolf . | |

FOREIGN PATENT DOCUMENTS

| | | | |
|---|---|---|---|
| 861868 | 1/1971 | Canada | 72/385 |
| 0058994 | 1/1982 | European Pat. Off. . | |
| 2447805 | 10/1980 | France | 493/456 |
| 421905 | 4/1967 | Switzerland | 493/454 |
| 819832 | 9/1959 | United Kingdom . | |
| 1012534 | 3/1964 | United Kingdom . | |
| 1010976 | 11/1965 | United Kingdom . | |
| 1100532 | 1/1968 | United Kingdom . | |

Primary Examiner—Frederick R. Schmidt
Assistant Examiner—Robert Showalter
Attorney, Agent, or Firm—Cushman, Darby & Cushman

[57] ABSTRACT

A method and apparatus for making axial-flow filters wherein a sectorial-shaped sheet of filter material having corrugations therein parallel to the curved ends thereof is made from a flat sheet of filter material in the first step, and thereafter the corrugated sheet is made into an annulus to obtain the final product. In the first step, an edge portion of a flat sheet of filter material is attached to a sectorial-shaped mold, having a mold surface defined by curved ridges and valleys parallel to the curved ends of the mold, so that the sheet is slanted up away from the mold surface from the smaller curved end of the mold. Thereafter a set of curved forming blades is moved down toward the mold to engage the sheet and to fold it successively and consecutively across the ridges of the mold and beneath the edges of the blades into the valleys of the mold to corrugate the sheet. In the second step, the corrugated sheet thus produced is made into an annulus by using a contouring belt which embraces the larger convexly curved ends of the sheet and constricts the sheet into an annulus.

15 Claims, 13 Drawing Figures

METHOD FOR MAKING AXIAL-FLOW FILTERS AND APPARATUS THEREFOR

BACKGROUND OF THE INVENTION

The present invention relates to a filter, particularly an annular axial-flow filter that is useful to filtrate foreign matters from air or oil. The axial-flow filter of the present invention is compact and light weight, therefore useful in various kinds of vehicles. The subject of the present invention is in the method to mass produce axial-flow filters and the apparatus to make those filters.

Conventionally, an axial-flow filter is made in a very primitive way, i.e., they used a flexible base sheet made of many corrugations, and they applied a flat sheet of filter material onto the base sheet, and then folded the filter material along the corrugations of the base sheet by hand to finally obtain a corrugated sheet of filter material. The method is as readily understood very unstable and time consuming. Therefore it took, for example, two minutes to make an axial-flow filter which is about 300 mm in diameter, which shows very low productivity. Especially it was impossible to uniformly fold the corrugations since it relied on hand work of workers in the line. Therefore the filtration performance varies from one filter to another and the appearance of the resultant filter is poor, thus reducing the value of the merchandise. Aside from the method above explained, applicants are not informed of any other method to produce an axial-flow filter. It is conceivable that an automated process to make the filter is difficult, since it has to deal with soft or flexible filter material which is different from rigid and solid material like metal or hard plastic.

SUMMARY OF THE INVENTION

The present invention proposes to obtain a practical and rapid way to produce an axial-flow filter and to provide apparatus therefor. In the present invention, an annular axial-flow filter is made between a sectorial-shaped mold located under the filter material and a set of forming blades which is moved to the mold to fold the filter material to obtain curved corrugations in the filter material. In the process, the filter material is corrugated with a precise curvature in a short time. This process would be useful in corrugating other than filter material such as fine metallic material or plastic material.

Another purpose of the present invention is to make the corrugated sheet, obtained as described above, annular in a succeeding operation where the corrugated material is constricted circumferentially to get the two straight sides together to make as a whole an annular axial-flow filter. This process is accomplished in machinery developed by us at a high speed.

The above two operations may be combined together to make the corrugated material first and after that the rounding operation is combined, thus making a continuous line to make axial-flow filters from a flat sheet of filter material to the annular end product, i.e. an axial-flow filter.

Other objects, features, and advantages of the present invention will become apparent from the following description and drawings of the present invention.

DETAILED DESCRIPTION OF PREFERRED EMBODIMENTS

Figure 1:
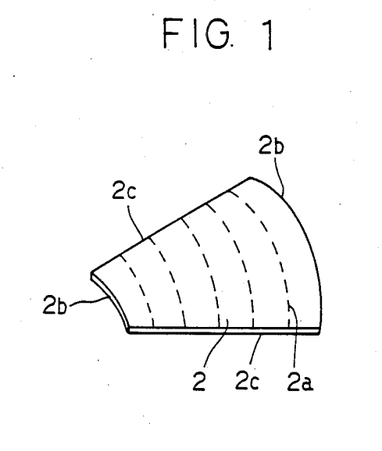
FIG. 1 is a perspective view of a fan or sectorial-shaped flat sheet of filter material.

FIG. 1 shows a flat sheet of filter material 2 which is cut to be of a fan-shaped or sectorial-shaped configuration. The flat sheet has two opposite curved ends or edges 2b having substantially the same center of curvature and two opposite tapered or converging straight side edges 2c and also a set of curved fold lines or depressions 2a which have substantially the same center of curvature as the curved edges 2b. Numeral 3 designates a sectorial-shaped mold which has a curved wavy mold surface 3a. The curved wavy surface 3a is made of curved valleys which have bottom edges and curved ridges which have top edges. The curved wavy surface 3a with the curved valleys and ridges is curved about a certain common center. The effective surface of the mold 3 terminates at its smaller curved end in an upward and inward inclined ridge side 3b.

Figure 2:
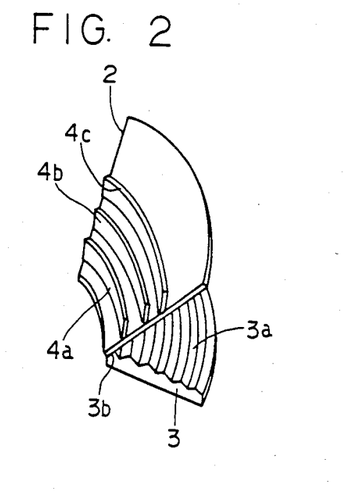
FIG. 2 is a perspective view showing the flat sheet of FIG. 1 attached to a mold to produce curved corrugations.
Figures 3, 4:
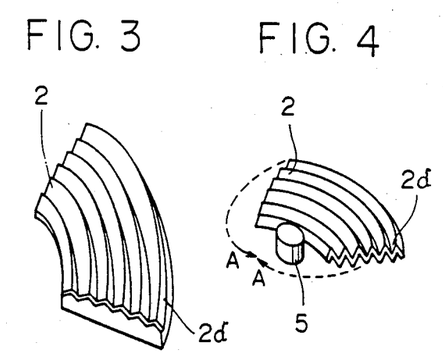
FIG. 3 shows a perspective view of the flat sheet corrugated on the mold.
FIG. 4 is a perspective view showing the corrugated sheet placed on a center rod around which the curved sheet is made round or annular.
Figure 5:
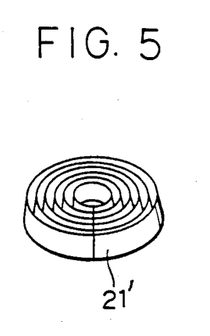
FIG. 5 is a perspective view of the final product, i.e. an axial-flow filter.

The smaller curved marginal edge portion of the flat sheet of filter material 2 is fixed or clamped to the curved ridge side 3b as shown in FIG. 2. Thus, the flat sheet of filter material 2 is concavely curved upward and also inclined up from the curved wavy surface 3a in the configuration of a sector of a frusto-conical surface. On the upper surface of the clamped sheet of filter material 2 thus inclined is arranged a set of forming or folding blades 4a, 4b, 4c, etc., one for and aligned with each valley and corresponding in curvature thereto. Then the set of blades 4a, 4b, 4c, etc. is moved downward against the sheet of filter material 2 to fold it successively across the ridges and beneath the edges of the blades into the valleys in the curved wavy surface 3a as shown in FIG. 3 to form curved corrugations 2d in the sheet parallel to the curved ends of the mold 3. The corrugated sheet 2 thus produced is then positioned against a center rod or post 5 and the sheet is pushed against the post while simultaneously constricting it thereabout to bring the straight edges of the sheet at the ends of the corrugations into substantially abutting engagement, as shown by dotted lines A in FIG. 4, and so shape the corrugated sheet into a round or annular configuration to make the final product, i.e. the axial-flow filter 21' shown in FIG. 5.

Figure 6:
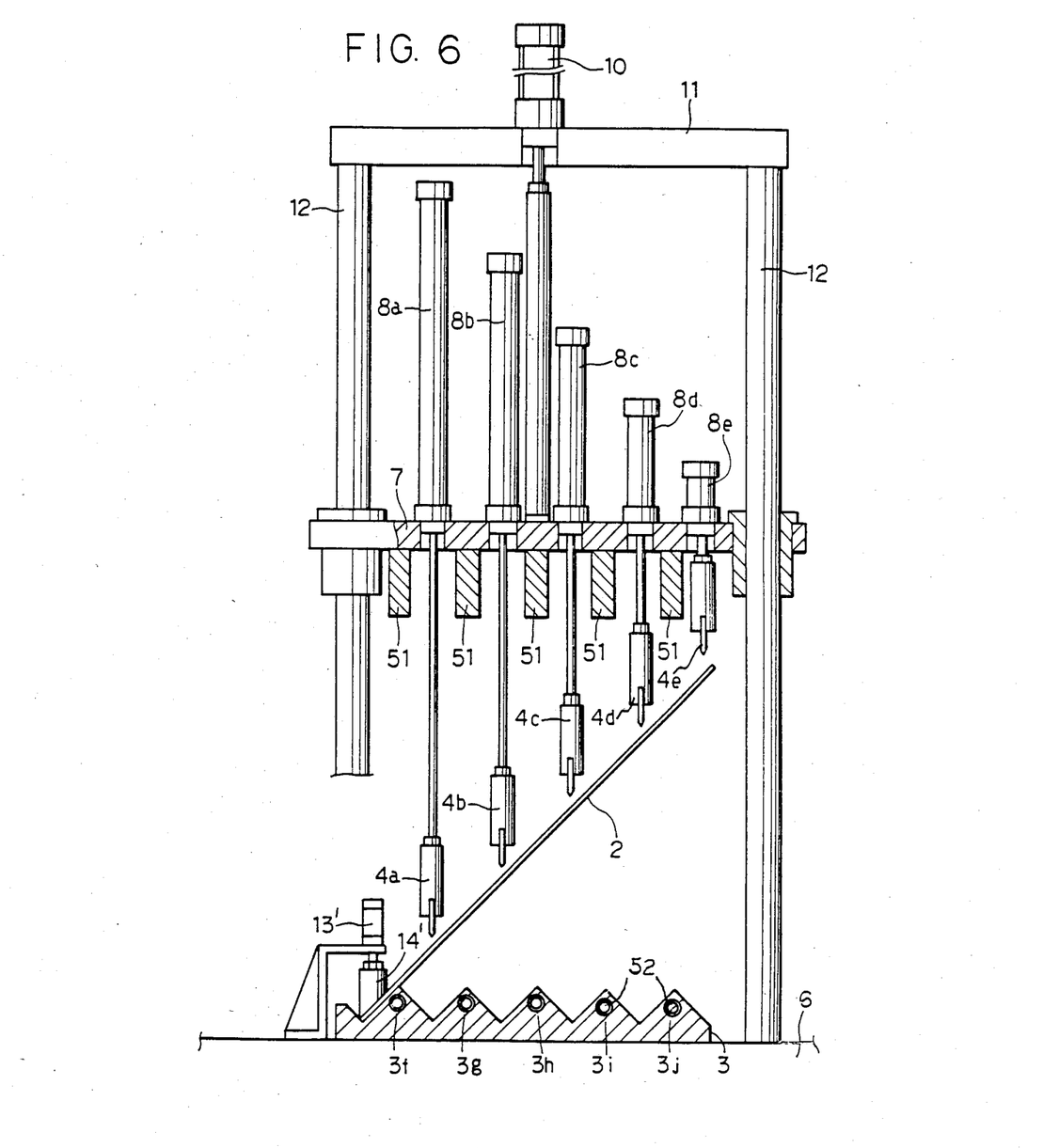
FIG. 6 is a partial cross-sectional side view of the apparatus employed to make the curved corrugations in the flat sheet.

The process steps illustrated in FIGS. 2 and 3 are now described in detail with reference to the apparatus shown in FIGS. 6 and 7. The mold 3 supported on a base 6 has longitudinally curved ridges 3f, 3g, 3h, 3i and 3j, separated by corresponding valleys. The smaller curved edge portion of the flat sheet of filtering material 2 is clamped to the upward and inward inclined side of the the smallest curved ridge 3f by a curved clamp 14', which may be operated by air cylinder 13' to thus incline the sheet 2 upward and inward above the other ridges of the mold, as shown in FIG. 6. The curved side of the ridge 3f will also result in concavely curving the upper side of the sheet 2. When the clamp 14' is operated, as shown in FIG. 6, the set of curved forming blades 4a-4e is positioned, as shown in FIG. 6, i.e. each of the blades is located close to the upper surface of the inclined sheet. The blades 4a-4e are moved by air cylinders 8a-8e, respectively. All the cylinders 8a-8e are fastened to a plate 7 movable vertically by a hydraulic cylinder 10 and guided on upright columns 12 connected by an upper cross beam 11 which supports the cylinder 10.

Therefore, when the plate 7 is moved downward by the cylinder 10, all the cylinders 8a-8e and blades 4a-4e move down simultaneously toward the mold 3. As the plate 7 moves down, the blade 4a first folds the sheet 2 across the ridge 3f and under the edge of the blade 4a in such a manner that the blade 4a mates with the bottom of the valley of the mold 3 between the ridges 3f and 3g to make the first corrugation. The next blade 4b is moved against the sheet 2 to form the next corrugation. Likewise, the succeeding blades 4c, 4d and 4e are moved downward to successively make the remaining corrugations in the sheet 2 on the mold 3. It will be noted that the blades 4a-4e are relatively sharp and that their width is much less than that of the mold valleys so that only the tips of the blades mate with the bottoms of the valleys and so the sheet 2 is frictionally engaged only by the blade tips and valley bottoms.

During downward movement of the plate 7, the piston rods supporting the blades are pushed back successively into their respective air cylinders as each blade engages the bottom of its corresponding valley. Since the initial relative vertical positions of the blades 4a-4e are differentiated stepwise, a single downward movement of the plate 7 folds the sheet 2 successively and consecutively across the mold ridges at high speed to make curved corrugations 2c in the sheet on the mold 3. Although air cylinders are shown as being utilized for moving the forming blades 4a-4e, it is possible to replace these cylinders with simple springs to allow retracting movement of the blades as they engage the mold and to extend them when the plate 7 is raised.

Numeral 51 designates heaters carried by the plate 7 in position to press and heat the top edges of the corrugations in the sheet 2, when the plate is in its lowermost position, to deform the sheet permanently at its top fold line portions and to fix the corrugations. The mold 3 may include heaters 52 embedded in the ridge portions 3f-3j to heat the bottom edges of the corrugations in the sheet. Thus, the curved corrugations made in the sheet 2 on the mold 3 with the forming blades 4a-4e may be made rigid to keep their curved shape when the blades are retracted.

Figure 7:
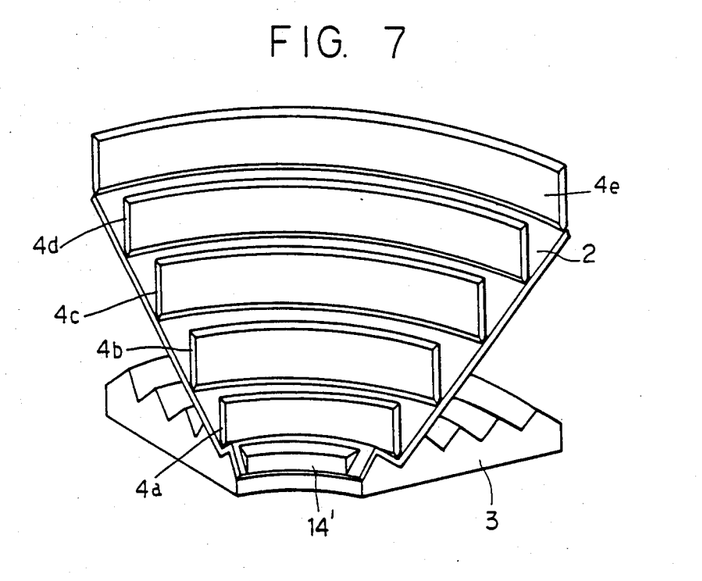
FIG. 7 is a front view of a set of forming blades which cooperate with the mold to fold the flat sheet successively.

The initial relationship between the blades 4a-4e, the flat sheet of filter material and the mold 3 is as shown in FIGS. 6 and 7. As is apparent therein, the sheet 2 is slanted upward from the smaller curved end thereof and also is concavely curved upward above the mold 3. The initial locations of the forming or folding blades 4a-4e are also shown in FIGS. 6 and 7, i.e. each blade is positioned just above the inclined and curved surface of the sheet of filtering material 2. Each of the blades 4a-4e is also curved longitudinally to mate with the bottom of the corresponding valley in the curved wavy surface of the mold 3. The edges of the blades 4a-4e facing the mold preferably are sharpened as shown. Also, the blades are progressively longer toward the longer curved edge of the sheet 2.

In FIGS. 6 and 7, the tops of the ridges 3f-3j and bottoms of the valleys therebetween lie in planes parallel with the horizontal surface of the base 6. However, it is possible to modify such planes in respect of the surface of the base 6. If done so, the resultant corrugated sheet would have such planes reshaped into sectorial segments of a frusto-cone. To obtain such a configuration, the curvy wavy surface of the mold 3 should be modified a little, e.g. corresponding sides of the ridges can be made longer than the other sides. If these modifications are made to the surface of the mold 3, it is possible to obtain the aforedescribed frusto-conical configuration on the mold 3. In practical use, for example in automobiles, a slightly conical axial-flow filter made by rounding the frusto-conical configuration obtained on the mold is better mounted in an air cleaner since a slightly conical axial-flow filter provides a space through which the filtered air can communicate with the intake system of the engine.

Figure 8:
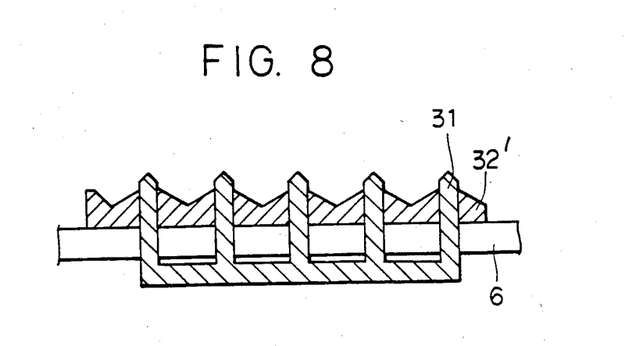
FIG. 8 is a cross-sectional view of a mold of a modified construction.

FIG. 8 shows another embodiment of the mold 3 where it is divided into two parts, i.e. top mold 31 and base mold 32'. The top mold 31 functions to form the top edges of the ridges 3f-3j to enable the mold to obtain various types of curved corrugations whose heights are different from each other. For example, if the top mold 31 is raised a little from the base mold 32', the flat sheet of filter material 2 is folded deeply to obtain a larger height or depth in the curved corrugations to be formed therein. By using such a modified mold, it is possible to obtain various configurations of corrugated axial-flow filters in the same apparatus. Even if the height of the folding is varied, curved configurations of any height can be obtained since the pitch of the corrugations or the pitch of the blades 4a-4e does not change.

An embodiment of the flat sheet material 2 is a three-ply filter material which has a coarse or low density on top, a medium density material next, and at the bottom a high density material. This kind of filter material is useful if it is used to pass the air from the coarser side to the high density side since the coarse material filters relatively larger particles of foreign materials first and then the last filter material filters any unpermissible smaller particles. When this kind of filter material is used in the apparatus described above, the coarse side of the material should face the blades 4a-4e. If the material is so placed in the apparatus, the curved corrugations obtained will have the coarse side on the top and the high density side on the bottom. When the filter is made conical, as explained above, the coarse side should be on the outer surface of the cone and the high density side is on the inner surface of the cone.

Figure 9:
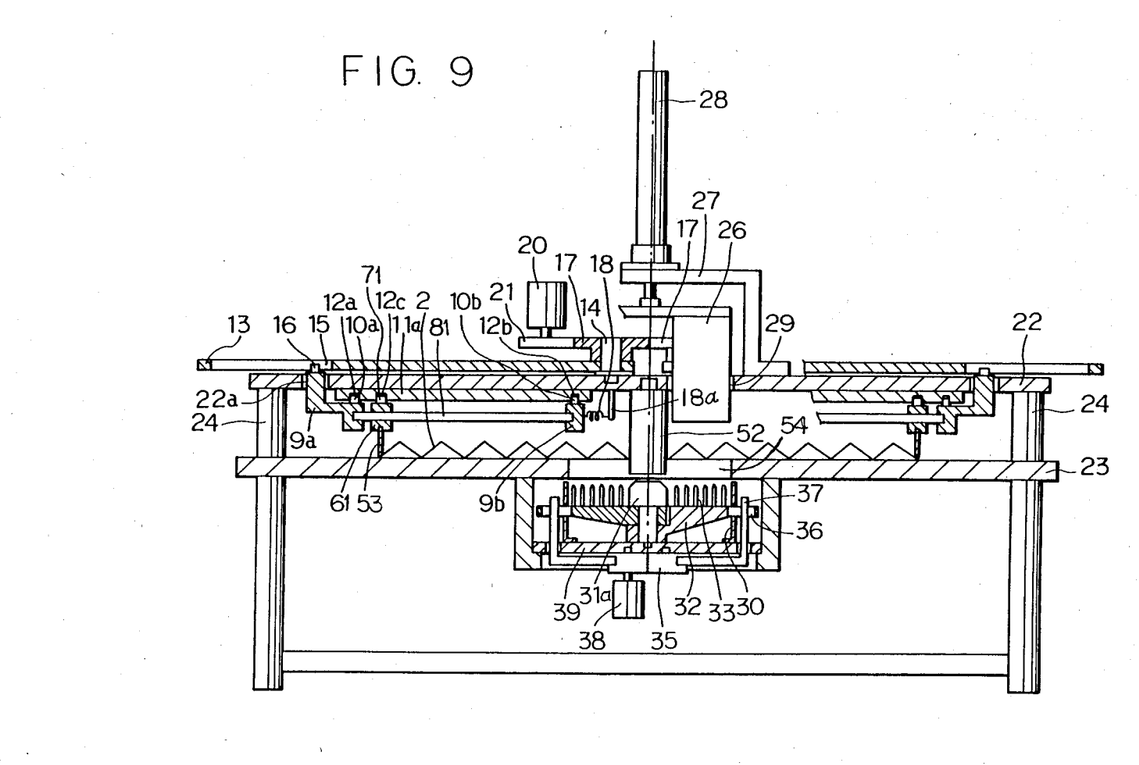
FIG. 9 is a partial cross-sectional front view of the apparatus to make the curved corrugated sheet annular.
Figure 10:
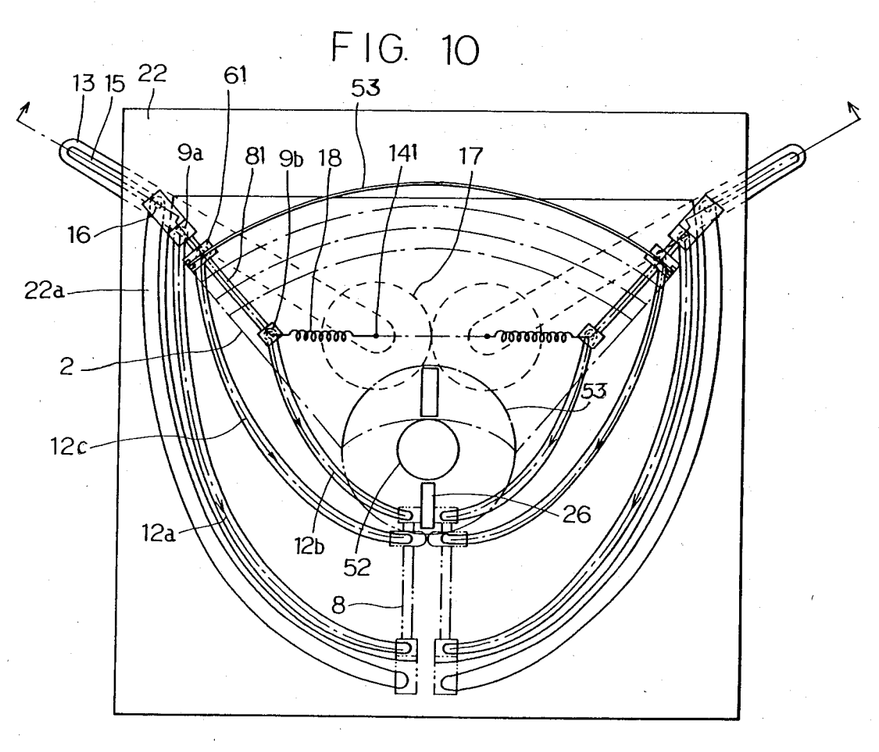
FIG. 10 is a bottom view of the apparatus shown in FIG. 9.

The processes and apparatus used to make the corrugated sheet circular or annular are next explained with reference to FIGS. 9 and 10. In FIG. 9, the corrugated sheet 2 is put on a flat plate 23, and its smaller curved edge is located in contact with a center rod 52. Numeral 53 designates a contouring belt which is curved at its initial position as shown in FIG. 10. The contouring belt 53 is made of a spring material so that it flexes when the ends of the belt are moved toward the center rod 52. The belt 53 is so located that it can embrace the longer curved edge of the sheet 2. Numeral 61 designates contouring belt holders to hold the respective ends of the belt 53. The belt holders 61 have cam followers 71 on top thereof and are slidable on guide bars 81. Both ends of each guide bar 81 are supported by bar holders 9a and 9b which have cam followers 10a and 10b, respectively, on the top thereof. Numeral 11a designates a cam plate fixed to the underside of a base plate 22 above the plate 23. Posts 24 support the plates 22 and 23. The cam plate 11a has three curved cam grooves 12a, 12b and 12c, on the underside thereof in which ride the cam followers 10a, 10b and 71, respectively. Each guide bar holder 9a has a portion projecting through a curved slot 22a in the plate 22 parallel to the corresponding cam groove 12a and that portion has another cam follower 16 engaged in a straight cam slot 15 in a separate lever 13 rotatable around a pin 14. The levers 13 are rotated by meshing gears 17, one of which is rotated by another gear 21 fixed to an output shaft of an air motor 20. Numeral 18 designates two coiled tension springs, each connected to a respective cam follower 10b and to a pin 18a substantially coaxial with a corresponding gear 17.

When the motor 20 is energized to rotate the gears 21 and 17, the levers 13 are rotated in opposite directions, the left one, as shown in the drawings, counterclockwise, and the right one clockwise. At that time the cam followers 16 move the guide bar holders 9a to follow their cam slots 22a. On the other hand, the holders 9b at the other ends of the bars 81 are pulled by the tension coil springs 18 toward the rotational centers of their respective levers 13. When the levers 13 are rotated as described above, the cam followers 10b also move along their cam grooves 12b. Since the cam followers 16 are guided by the straight slots 15 and since the bar holders 9b are pulled toward the rotational center of their levers 13, and also since the lengths of the guide bars 81 are fixed, the position and direction of the bars 81 are determined by the rotational angles of the levers 13. Therefore, the position and the direction of the belt holders 61 are also determined according to the rotational angle of the levers 13. When the belt holders 61 are moved along their cam grooves 12c to the final position shown in dotted lines in FIG. 10, the straight sides of the corrugated sheet meet together to make an annular axial-flow filter with a radius reduced from that of the corrugated sheet. When the guide bars 81 come to a parallel position, as shown in dotted lines in FIG. 10, the process of rounding the corrugated sheet is finished. The above-described arrangements of cam followers and cam grooves are made in such a way that the contouring belt 53 traces a line where the corrugated sheet 2 is made smaller and simultaneously made annular.

Figure 11:
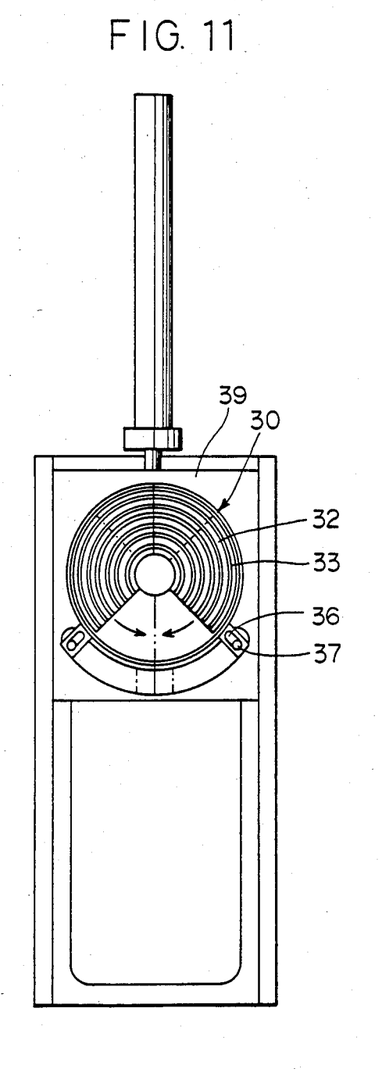
FIG. 11 is a plan view of a reshaper mounted in the apparatus of FIG. 9.

In FIG. 9, numeral 29 designates an aperture in the base plate 22 above the annular corrugated sheet 2 grasped by the belt 83. A pusher 26 extends through the aperture 29 and is operable by an air cylinder 28 supported by a bracket 27 fixed to the base plate 22. Below the rounded corrugated sheet 2 is a circular aperture 54 in plate 23 coaxial with the sheet and of slightly larger diameter. The rounded corrugated sheet 2 grasped by the belt 53 is pushed out of the belt down through the aperture 54 in the plate 23 to a reshaper 30 mounted on a slide plate 3a. The reshaper 30 is composed of two sectorial-shaped rotors 32a on which are narrow arcuate ridges 33 coaxial with the circular valleys in the underside of the annular corrugated sheet 2. At the center of the rotors is a fixed guide pin 31a comprising an extension of the pivot pin on which the rotors 32a are mounted. The rotors 32a are rotatable in opposite directions by arms 37 engaged in radial slots 36 in radially projecting parts of the rotors 32a. The arms 37 are rotated in opposite directions by meshing gears 35, one of which is driven by an air motor 38. The arcuate ridges 33 on rotors 32a are initially positioned, as shown in FIG. 11, in contact at one end and with a gap therebetween at the other. However, when the air motor 38 is actuated, the ridges 33 rotate toward each other to close the gap at one end and open a gap at the other, as shown by dotted lines in FIG. 11.

Figure 12:
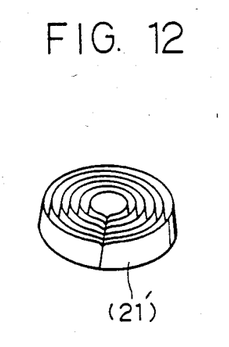
FIG. 12 shows the curved corrugated sheet after being made annular in the apparatus of FIG. 9.

When the rounded corrugated sheet 2 is pushed into the reshaper 30, the curved valleys in its underside mate with the arcuate ridges 33 in their initial positions, registering the center hole of the round corrugated sheet 2 on the center guide 31a. At this time, the end portions of the curved corrugations in the sheet 2 are not exactly circular, as shown in FIG. 12. However, when the rotors 32 and narrow arcuate ridges 33 are rotated, as shown by the arrows in FIG. 11, the end portions of the corrugations are made circular by the ridges 33 of the reshaper 30. After the reshaping operation is finished, the slide plate 39 carrying the reshaper 30 with the reshaped corrugated sheet is pulled out so that the reshaped product can be removed for further processing.

Figure 13:
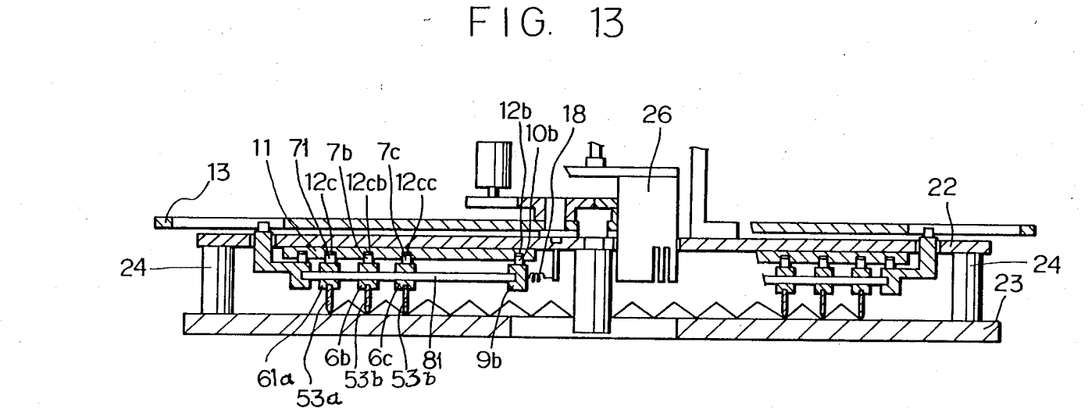
FIG. 13 shows a partial cross-sectional front view of a modification of part of the apparatus shown in FIG. 9.

Another embodiment of apparatus for rounding the corrugated sheet is explained with reference to FIG. 13. In this embodiment, there are three contouring belts 53a, 53b and 53c having their ends fastened to pairs of belt holders 61a, 61b and 61c, respectively, carried on guide bars 81 and having cam followers 7a, 7b and 7c engaged in corresponding cam grooves 12c, 12cb and 12cc. Since this apparatus has two more contouring belts than the apparatus shown in FIG. 9, the belts can grasp more ridges in the corrugated sheet 2. This construction is especially suitable when a large number of corrugations 2b are made in one sheet 2. The number of contouring belts depends, of course, on the particular axial-flow filter desired. It has been found that five contouring belts are suitable when one makes an axial flow filter with nine corrugations, i.e. ridges or valleys. In the arrangement of FIG. 13, the pusher 26 must avoid interference with a plurality of contouring belts, e.g. 53a, 53b and 53c. Therefore, the pusher 26 has slots therein to accommodate the belts while pushing out the rounded corrugated sheet 2.

As explained above, the method and apparatus of the present invention to make axial-flow filters are suitable for mass production of the filters rapidly and uniformly. Especially it is possible to produce various kinds of axial flow filters, whose heights are different from each other and where the number of valleys or ridges differ from each other, in a single apparatus.

The method disclosed is for making a sheet having longitudinally curved corrugations therein from a flat sheet of filter material, including the steps of preparing a sectorial-shaped flat sheet of filter material, preparing a mold having a curved wavy sectorial-shaped molding surface, i.e. curved valleys and ridges, fixing the smaller end of the flat sheet to the smaller curved end of the mold so that the flat sheet is concavely curved upward and inclined upward with respect to the molding surface, arranging a set of curved forming blades above the inclined sheet to move down and mate with the bottom of the valleys in the molding surface, moving the set of blades toward the molding surface in such a manner that the blade closest to the fixed end of the flat sheet is moved first and thereafter the successive blades are moved consecutively, and thus folding the fixed sheet continuously along said curved wavy mold surface to make curved corrugations in the sheet.

The method also includes positioning a center rod close to the concavely curved smaller end of the corrugated sheet, positioning a contouring belt over the convexly curved larger end of the corrugated sheet, and moving and constricting the contouring belt toward the center rod in such a manner that the belt makes a circle around the center rod and so that the corrugated sheet is made annular between the belt and the rod.

Further, an apparatus is disclosed for making an axial-flow filter from a sectorial-shaped flat sheet of filter material comprising a sectorial-shaped mold having a wavy curved molding surface, i.e. curved ridges and valleys, which corresponds to a corrugated sheet from which the axial-flow filter is made, the smaller convexly curved end portion of said mold being defined by an upward and inwardly inclined side of a curved ridge, means for fixing or clamping the smaller end of the flat sheet to said side of said ridge in such a manner that the flat sheet is upward concave and inclined up over the mold surface, a set of curved forming or folding blades arranged above the inclined sheet corresponding to the bottom of the valleys in the mold, and means for moving the blades sequentially and consecutively into the mold valleys starting with the blade closest to the clamped end of the sheet, so that curved corrugations are formed in the sheet. Separate apparatus comprises a center rod located centrally against the smaller concavely curved end of the corrugated sheet, a contouring belt arranged around the convexly curved longer end of the corrugated sheet for embracing the same, means for grasping each end of the contouring belt and means for moving the grasping means along predetermined paths so that the contouring belt makes a circle around the center rod to round the curved corrugated sheet.

What we claim is:

1. A method for making a sectorial-shaped sheet of filter material having parallel curved ends, converging straight sides and curved corrugations extending between said sides parallel to said ends, the steps comprising:

preparing a sectorial-shaped mold having parallel curved ends, straight converging sides and a mold surface defined by longitudinally curved ridges and valleys extending between said sides parallel to said curved mold ends;

clamping an edge portion of a flat sheet of filter material to an upwardly and inwardly inclined side of a ridge of said mold at the smaller concavely curved end thereof so that said sheet becomes concave upward and inclined up over said mold surface;

arranged a set of longitudinally curved forming blades above said clamp sheet, each blade being aligned and positioned to move into mating relation with the bottom of a valley in said mold surface, each blade being narrower than the corresponding valley except at the blade tip so that as each blade moves into said mating relation a gap larger than the thickness of said sheet exists between the sides of the blade and the side walls of the corresponding valley;

moving said set of blades into said mating relation consecutively beginning with that blade closest to said clamed edge portion of said sheet to fold the latter successively across said ridge and beneath said blade tips into said valleys to form longitudinally curved parallel corrugations in said sheet.

2. The method defined in claim 1 further comprising:

heating and pressing the top edges of the corrugations in the sheet while on the mold to fix the corrugations in the sheet.

3. The method defined in claim 1 or 2, further comprising:

heating the mold while the sheet is thereon to fix the corrugations in the sheet.

4. The method defined in claim 1 wherein:

the flat sheet is sectorial-shaped with parallel curved ends and straight converging sides and the curved edge portion of the smaller end of the sheet is clamped to the mold.

5. The method defined in claim 1 in which the corrugated sheet is sectorial-shaped with parallel curved ends and coverging straight sides and further comprising:

positioning the concavely curved samller end of the corrugated sheet centrally against a center rod;

positioning a contouring belt about the convexly curved larger end of the corrugated sheet; and moving said contouring belt toward and constricting it about said center rod in such a manner that that belt assumes a circular configuration around said center rod and rounds and constricts said corrugated sheet to bring its straight sides into substantially abutting realation and to form said sheet into a substantially annular configuration.

6. The method defined in claim 5 further comprising:

preparing a set of parallel shaping blades curved longitudinally with radii corresponding to those of the bottoms of the valleys in one side of the rounded sheet and of lesser longitudinal extent than the corresponding valleys;

disposing said blades in said valleys at locations therein removed from the straight sides of the rounded corrugated sheet; and rotating said blades toward and to said sides to reshape said valleys adjacent and at said sides into precise curved configurations about the axis of the rounded sheet.

7. Apparatus for making a sectorial-shaped sheet of filter material having parallel curved ends, converging straight sides and curved corrugations extending between said sides parallel to said ends, comprising:

a sectorial-shaped mold having parallel curved ends, straight converging sides and a mold surface defined by longitudinally curved ridges and valleys extending between said mold sides parallel to said curved mold ends;

means associated with said mold for clamping an edge portion of a flat sheet of filter material to an upward and inwardly included side of a ridge of said mold at the smaller concavely curved end thereof so that said sheet becomes concavely curved at the surface thereof opposite said mold surface and is inlcined up thereover;

a set of longitudinally curved forming blades spaced from said mold surface and aligned and positioned to move into mating relation with the bottoms of the valleys in said mold surface and to engage and move therewith the inclined sheet, each blade being narrower than the corresponding valley except at the blade tip so that as each blade moves into said mating relation a gap larger than the thickness of said sheet exists between the sides of said blade and the side walls of the corresponding valley; and means associated with said mold for supporting and moving said blades from their initial positions spaced from said mold surface into said mating relation consecutively beginning with that blade closest to said clamped edge portion of said sheet to fold the latter successively across said ridges and beneath said blade tips into said valleys to form longitudinally curved parallel corrugations in said sheet.

8. The apparatus defined in claim 7 wherein:
the blade supporting and moving means includes means for initially supporting the blades at conscecutively increasing distances from the mold beginning with that blade closest to the concavely curved smaller end of said mold for moving all said blades simultaneously toward said mold and for yieldingly supporting each blade on said supporting and moving means so that as each blade arrives at said mating relation the remaining blades continue to move into that relation.

9. The apparatus defined in claim 7 including a set of heaters located between the blades and movable therewith to press and heat the top edges of the corrugations in the sheet while on the mold for fixing the corrugations in the sheet.

10. The apparatus defined in claim 7 including a set of heaters embedded in the ridges of the mold for heating the sheet while on the mold to fix the corrugations in the sheet.

11. Apparatus for rounding and shaping into an annular configuration a sectorial-shaped sheet of filter material having parallel curved ends converging straight sides and curved corrugations extending between said sides parallel to said curved ends comprising:

a rod against which the concavely curved smaller end of the corrugated sheet is to be centrally engaged;

a contouring belt adapted to be arranged about the larger convexly curved end of the corrugated sheet when engaged with said rod;

and means engaged with the ends of said belt for moving the latter toward said rod while constricting said belt about said rod into a generally circular configuration to thereby round and constrict a corrugated sheet engaged with said rod to bring the straight sides of the sheet into substantially abutting relation and to form the sheet into a substantially annular configuration.

12. The structure defined in claim 11 including at least one additional belt adapted to be disposed within a valley of one of the corrugations of the sheet; and means engaged with the end of said at least one additional belt for moving and constricting it simultaneously with the first mentioned belt to assist the latter in rounding and constricting the sectorial-shaped sheet into a substantially annular configuration.

13. The structure defined in claim 11 further comprising:

a reshaper for the ridge and valley portions of the annular sheet adjacent the abutting sides thereof, including:

a set of curved blades corresponding to the valleys in one side of the annular sheet and adapted to be positioned in and to engage the bottoms of those valleys, said blades being of lesser extent longitudinally than the corresponding valleys; and means for rotating said blades about the axis of the annular sheet to and adjacent the straight abutting sides of the annular sheet to reshape said valleys at said portions into precise curved configurations about said axis.

14. The structure defined in claim 13 in which the reshaper further includes a central pin for mating with the central hole in the annular sheet.

15. The structure defined in claim 14 including:
means for removably supporting the reshaper in axial alignment with an annular sheet grasped by the belt; and means for pushing the annular sheet axially out of the belt onto the reshaper.

* * * * *